United States Patent
Allen et al.

[11] 3,752,383
[45] Aug. 14, 1973

[54] SOLDERING APPARATUS

[75] Inventors: Melvin K. Allen, Los Angeles; H. Peter Eschenbrucher, Diamond Bar, both of Calif.

[73] Assignee: Technical Devices Company, Cleveland, Ohio

[22] Filed: Nov. 11, 1971

[21] Appl. No.: 197,990

[52] U.S. Cl................... 228/37, 29/471.1, 29/484, 29/503, 118/259, 118/400, 228/36
[51] Int. Cl............................................. B23k 1/08
[58] Field of Search................. 29/471.1, 484, 490, 29/503; 117/113, 114; 118/259, 400; 228/36, 37, 40

[56] References Cited
UNITED STATES PATENTS

| | | | |
|---|---|---|---|
| 3,612,388 | 10/1971 | Wegener et al. | 228/36 X |
| 3,589,590 | 6/1971 | Fitzsimmons | 29/503 X |
| 3,565,319 | 2/1971 | Eschenbrucher | 228/37 |
| 3,452,916 | 7/1969 | Andis | 228/36 |
| 3,398,873 | 8/1968 | Wegener et al. | 228/37 |
| 3,216,642 | 11/1965 | DeVerter | 228/37 |
| 3,198,414 | 8/1965 | Tardoskegyi | 228/37 |
| 3,058,441 | 10/1962 | Walker et al. | 228/33 |

Primary Examiner—J. Spencer Overholser
Assistant Examiner—Robert J. Craig
Attorney—Richard J. Rengel

[57] ABSTRACT

Homogenization of petroleum oil in molten solder is produced in stages in an agitation chamber formed about the outlet of a solder pump of a standing wave soldering machine. In the first stage, a high pressure stream of oil is directed at the pressure faces of the pump propeller blades to produce intermittent counteracting forces creating turbulence which reduces the oil to small particles and distributing them in the oppositely moving stream of molten solder. In the second stage, droplets or globules of oil remaining in the stream of oil and molten solder separate rising to the top of the agitation chamber to be drawn through an impeller agitator which completes the reduction of the oil globules to finely divided particles which are distributed uniformly throughout the surrounding molten solder by shearing action of the agitator. The homogenized mixture of oil and molten solder flows into a pressure tank of the soldering machine to produce a standing wave of solder at a duct orifice.

4 Claims, 2 Drawing Figures

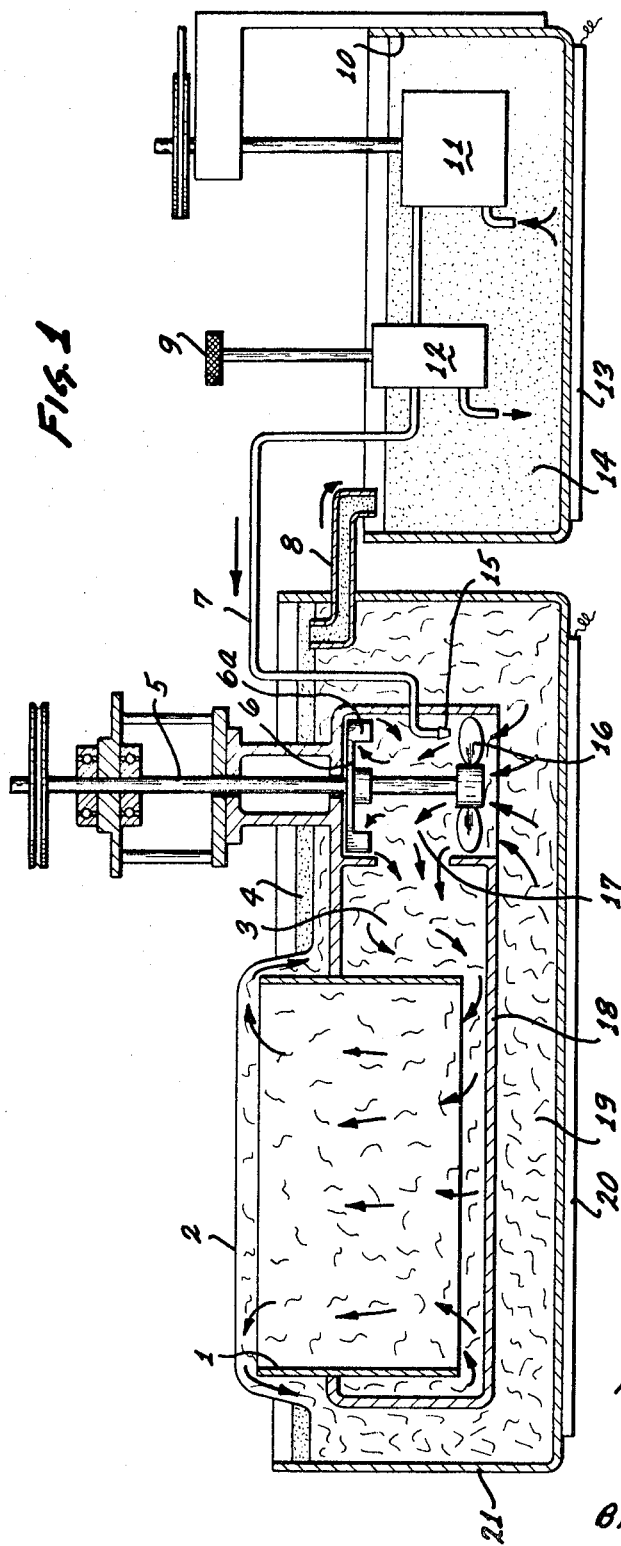
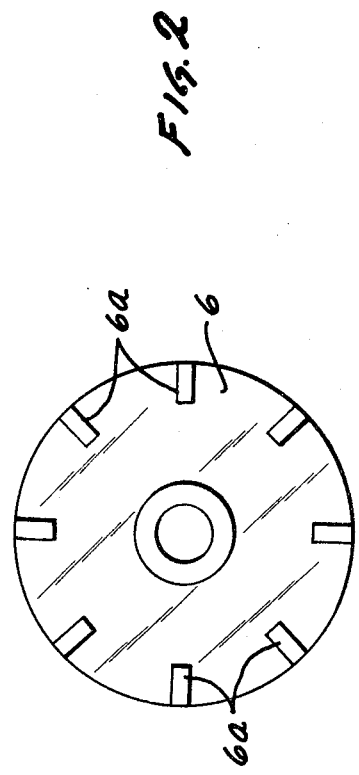

SOLDERING APPARATUS

BACKGROUND OF THE INVENTION

In the preferred arrangement for application of molten solder to printed circuit boards and the like; a standing wave of molten solder of uniform height and desired width is produced by pumping solder, heated to the molten (liquid) state, through a duct orifice, and passing the underside of a printed circuit over the solder wave so as to engage the solder wave and thereby cause the solder to adhere to copper-clad portions of the underside of the circuit board, including plated openings and component terminals or wires disposed in the openings to form electrical circuits including components thereof which are mounted on the upperside of the circuit board. Apparatus of this type is disclosed more fully in commonly assigned U.S. Pat. No. 3,565,319 issued to H. P. Eschenbrucher on Feb. 23, 1971, for example.

In certain soldering applications, it has been found to be advantageous to provide molten solder in which a wetting agent is mixed in order to satisfy circuit board soldering specifications. In U.S. Pat. Nos. to Young (2,870,532) and Walker et al. (3,058,441), for example, a wetting agent is mixed with molten solder to coat the solder with the wetting agent. In either of the prior art arrangements, a coating of the solder with wetting agent is obtained to "prevent" oxidation of the solder. In the Young arrangement, a flux coating is produced at the outlet of the solder nozzle and over the molten solder supply. In the Walker et al arrangement, the solder and wetting agent is mixed at the inlet to a solder pump so that the discharged solder stream is coated with the wetting agent. The use of wetting agents such as petroleum oil to reduce oxidation and surface tension of solder was recognized by Pessil (U.S. Pat. No. 2,671,164) in a dip-soldering arrangement in which the circuit boards were dipped in solder bath having a top layer of petroleum oil.

In each of the foregoing prior art soldering arrangements, there is no apparent recognition of the need or desireability of eliminating globules of the wetting agent or oil to effect complete homogenization of the oil in the molten solder stream. In contrast, by the present invention, it has been found that reducing the oil to finely divided particles and distributing the oil particles uniformly in a moving stream of molten solder produces substantial improvement in the wetting action by further reducing surface tension of the molten solder in a standing solder wave. The finely divided particles evenly dispersed in the molten solder are not only more effective than merely coating the molten solder discharged from a tube or nozzle, but also a smaller amount of oil is necessary, depending on the particle size and uniformity of distribution, i.e., degree of homogenization. Further, the prior art arrangements, providing coating of solder stream, are particularly disadvantageous when applied to improved standing wave soldering apparatus of the type disclosed in the commonly assigned patent and in the present application. This soldering apparatus produces the standing solder wave by pumping molten solder from an outer solder tank into an inner pressure tank. The solder flows in a standing wave from a vertical duct projecting from the top of the pressure tank. It is important that the oil be broken down into small particles throughly dispersed in the molten solder to maintain a high degree of homogenization during the time interval the mixture is in the pressure tank and during flow therefrom to produce the standing solder wave.

SUMMARY OF THE INVENTION

The present invention is directed to improved apparatus and methods of producing molten solder having finely divided particles of wetting agent uniformly dispersed therein for application to circuit boards and other soldering applications.

The improved soldering method comprises introducing a wetting agent such as petroleum oil into a moving stream of molten solder in a manner such that the oil is subjected to a high degree of turbulence causing it to be reduced to small, finely divided particles which are uniformly dispersed into the stream of molten solder to produce a homogeneous intermixture of molten solder and oil.

A homogenized intermix of oil in the solder wave reduces the surface tension of the molten solder, resulting in substantially improved wetting, improved flow of solder into small intricate areas of printed circuits, improved penetration of solder into plated through holes, reduction of solder bridging between circuits, and reduction of icicles and solder build-up.

When oil is introduced into a moving stream of molten solder without a means of throughly breaking the oil down into small particles, the oil appears on the wave in the form of droplets or globules. Since the primary purpose of introducing oil in the solder wave is to reduce the surface tension of the molten solder, small finely divided particles, evenly dispersed in the molten solder are more effective and a smaller amount of oil metered into the same quantity of molten solder becomes more effective, depending on the degree of reduction in particle size and uniformity of distribution. The reduction of droplets or globules to small particle sizes also prevents the entrapment of oil in confined areas or pockets of the processed circuit boards or the like. Accordingly, an object of the present invention is to provide methods and apparatus having features which overcome the aforementioned limitations and disadvantages of prior art arrangements.

Another object of the invention is to provide method and apparatus for uniformly dispersing very small particles of oil in molten solder for soldering.

A further object of the invention is the provision of a method for homogenization of oil in a stream of molten solder.

These and other objects will become apparent from the detailed description which follows:

BRIEF DESCRIPTION OF THE DRAWINGS

FIG. 1 is side view of the preferred soldering apparatus of the present invention, shown partly in section and by block diagram.

FIG. 2 is an end view of the impeller agitator showing the impeller blades.

DETAILED DESCRIPTION OF THE PREFERRED EMBODIMENT

Referring now to the drawings, in FIG. 1 the preferred soldering apparatus of the present invention is shown that it provides improved methods for application of solder to printed circuit boards and to other electrical or mechanical units which may be conveyed or passed over a standing wave 2 of molten solder. The standing solder wave comprises an intermix of finely divided oil particles, uniformly dispersed in the stream of molten solder. The solder wave 2 is formed above an elongated orifice in a solder discharge duct 1 by the flow of molten solder therethrough from an inner pressure tank or chamber 3. The oil particles in the solder wave eventually separate from the molten solder in the outer solder supply tank to form a floating layer of oil 4 on molten solder 19. The floating oil 4 is returned by gravity feed to an oil supply tank 10 through an oil return tube 8 to accumulate an oil reservoir or supply 14.

The oil is drawn from the supply tank 10 by an oil pump 11 and forced under pressure through an oil line 7 to an injection nozzle 15 where it is discharged in the form of a high pressure, jet stream directed onto the pressure faces of the rotating solder propeller blades in the direction and area as shown on FIG. 1. The stream of oil is interrupted by the propeller blades three or more times during each rotation of the propeller 16, depending upon the number of blades. Assuming the propeller selected has three blades and the shaft 5 is driven at a speed of 500 RPM, the interruption of the oil stream would be produced 25 times each second, for example, to produce the desired degree of turbulence in a first stage of homogenization.

Propeller 16 and impeller 6 are concentrically mounted on a single solder pump drive shaft 5 which is driven by a suitable motor drive coupled to the pulley at the upper end of the drive shaft 5. A suitable motor drive is also provided for driving oil pump 11, preferably a positive displacement pump. The amount of oil injected into the stream of molten solder is regulated by adjustment of the flow control knob 9 which controls a flow meter valve 12, preferably including an adjustable bypass valve as shown. The solder and oil are heated to the desired temperature by heater elements 20 and 13, respectively.

In the operation of the preferred embodiment shown, molten solder 19 is drawn from solder tank 21 through the solder pump inlet by solder pump propeller 16. A stream of molten solder is produced at the outlet side of solder pump which outlet is located immediately above the upper trailing edges of propeller 16. The pump outlet leads into an agitation chamber 17 where the stream of oil from nozzle 15 is introduced into the counter-moving stream of molten solder.

The stream of oil introduced by injection nozzle 15 is directed downward to impinge on the pressure faces of the propeller blades including the trailing edges thereof. The counter-acting forces and varying intermittent pressures created as each propeller blade interrupts the oil stream produces a very high degree of turbulence in the pump outlet immediately adjacent the pump propeller for improved oil reduction and uniform dispersion of the finely divided reduced oil particles in the molten solder stream.

Since the intermix of solder and oil particles is directed upward in the agitation chamber 17, any droplets or globules of oil remaining in the stream and not throughly homogenized in the first stage, being lighter than solder, rise to the top of the agitation chamber area where they are drawn through the impeller agitator 6 and reduced to small particle size by a shearing action between the outboard tips of blades 6a (FIG. 2) of the impeller agitator 6 and opposing rough cast inner wall surfaces of the agitation chamber 17 of a second stage. The homogenized intermix of oil and solder is now forced out of the agitation chamber 17 into the pressure chamber 3 where turbulence of the flow of the intermix is dampened and a smooth flow of homogenized molten solder and oil enters the solder discharge duct 1 to form the solder wave 2.

The wetting agent or oil referred to above is a commercially available product specifically compounded for use in conjunction with molten solder and is a liquid at the temperature of molten solder. Some illustrative products which have been found suitable are as follows: "Epaflow," a product of Electronic Packaging Associates, Los Angeles, Calif.; "Alpha" 2350 "Reliaoil," a product of Alpha Metals, Inc., Jersey City, N.J.; "Loncotin" 1000-10, a product of London Chemical Co., Inc. Bensenville, Ill.; "Peblum" A, a product of Shell Oil Co.; SSO-66, an oil product of Acme Industrial Supply, Los Angeles, Calif.

In view of the foregoing, various modifications and variations of the present invention are contemplated and will be apparrant to those skilled in the art without departing from the spirit and scope of the invention.

What is claimed is:

1. In combination with solder application apparatus, an oil homogenization arrangement comprising:
   a solder pump having an outlet for producing a moving stream of molten solder;
   an agitation chamber formed about the pump outlet;
   means for producing a stream of oil in said chamber in a direction having at least a component counter to the direction of the stream of solder so that counterforces are produced in the chamber for turbulent intermixing and homogenization of the oil and solder; and
   wherein said pump includes a propeller having blades and said oil stream is directed at the pressure faces of the blades so that the stream of oil is interrupted by the blades to reduce the oil to small particles and disburse the oil particles uniformly throughout the molten solder emanating from the pump outlet.

2. The combination of claim 1 in which an impeller is disposed in the opposite end of the chamber from the pump outlet so that oil globules remaining in the intermixture formed in the chamber are reduced to small particles and disbursed uniformly in a second stage of homogenization.

3. The combination of claim 2 in which said impeller has blades about the periphery thereof and said chamber includes an irregular, annular inner surface about the periphery of the impeller so that oil globules driven radisly by the impeller are reduced to small particles by shearing between tips of the blades of the impeller and the irregular, annular surface.

4. In combination with solder application apparatus, an oil homogenization arrangement comprising:
   a solder pump having an outlet, said pump including a rotatably driven member having pump blades including pressure faces producing a moving main stream of molten solder emanating from said outlet during rotation thereof;
   means for producing a stream of oil directed under pressure at the pressure faces of said pump blades so that the directed oil stream is interrupted by the blades to reduce the oil stream to small particles and disburse the oil particles uniformly throughout the molten solder emanating from the pump outlet.

* * * * *